Jan. 26, 1960  F. L. BRASH  2,922,436
COMBINED TEST AND SAFETY VALVE
Filed Sept. 7, 1956
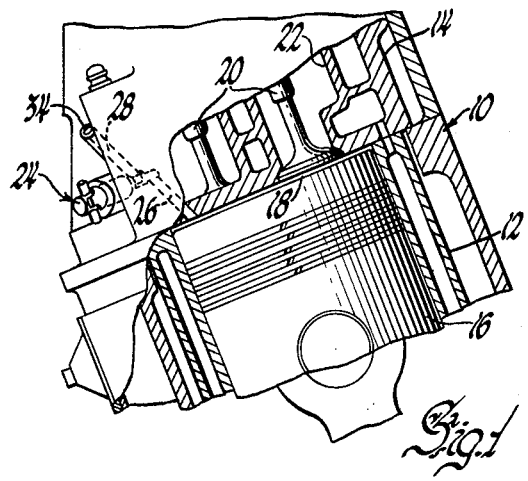
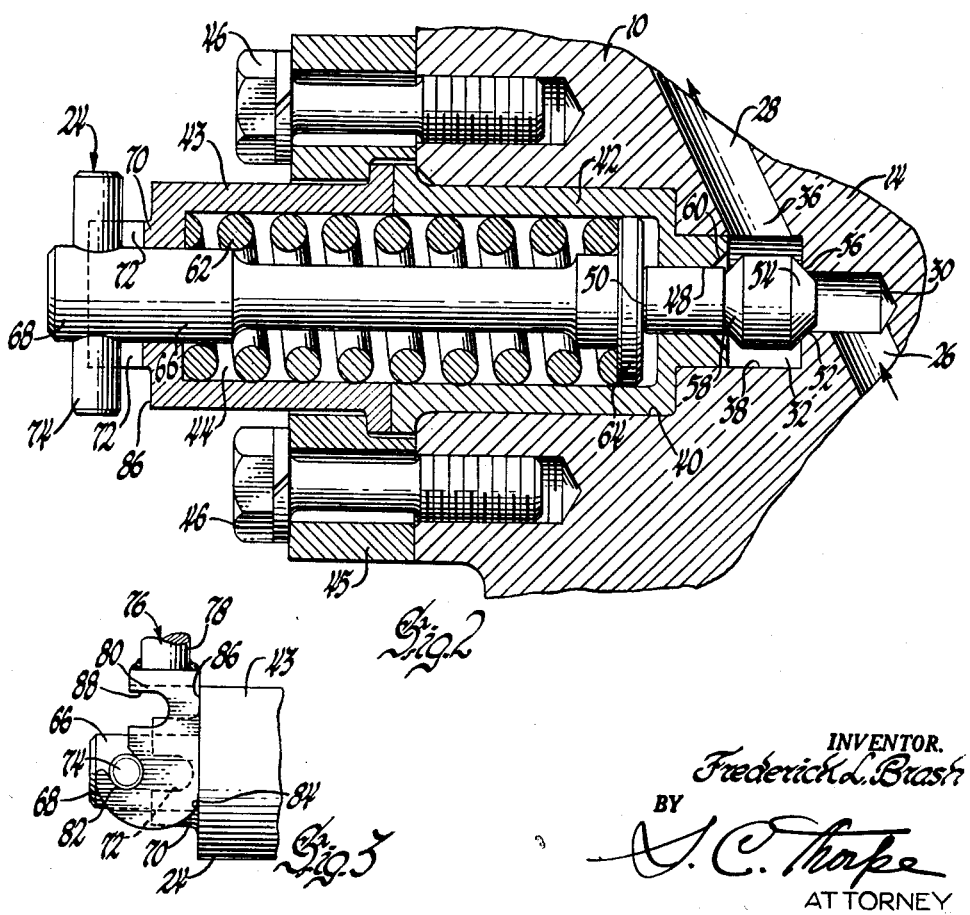
INVENTOR.
Frederick L. Brash
BY
J. C. Thorpe
ATTORNEY ବ୍ୟ
United States Patent Office 2,922,436
Patented Jan. 26, 1960

2,922,436
COMBINED TEST AND SAFETY VALVE

Frederick L. Brash, Cleveland, Ohio, assignor to General Motors Corporation, Detroit, Mich., a corporation of Delaware Application September 7, 1956, Serial No. 608,469

7 Claims. (Cl. 137—523)

This invention relates to a combined test and safety valve for venting high pressure, high temperature fluids from a device defining a chamber for such fluids; for example an internal combustion engine, a compressor or the like.

In certain pressure generating devices such as large high compression internal combustion engines, compressors and the like, it is necessary to provide a safety valve which opens if the pressure within the combustion or compression chamber exceeds a safe operating limit. It is also desirable in such devices to provide a test valve which may be used to vent the combustion or compression chamber of any accumulated water and oil before starting, to relieve the cylinder compression when turning the engine over by hand during certain maintenance and timing procedures, and to test the operating pressures within the cylinder.

In the past, numerous attempts have been made to combine both the safety and test valve functions into a single valve mechanism generally consisting of a valve member normally held against its seat by a compression spring in opposition to high pressure, high temperature gases within the cylinder below a predetermined upper safe operating limit and including means for lifting the valve member off its seat against the compression of the spring for test valve operation. However, such combined safety and valves generally have not proven too satisfactory. This is particularly true in internal combustion engine applications where the valve spring is subjected to relatively high temperatures due to the normal heat level of the engine, leakage of high temperature gases into the valve spring chamber, and the conduction of a substantial quantity of heat through the valve member to the valve spring. Over a period of time, the heat thus applied serves to anneal the valve spring, thereby progressively decreasing its biasing rate and its ability to maintain the valve member in its closed position.

It is a principal object of the invention to provide an improved combination safety and test valve mechanism for an internal combustion engine or the like capable of eliminating the aforementioned disadvantages of such previous valve mechanisms.

This object and other advantages and features of the invention will be more thoroughly understood from the following description of a preferred embodiment thereof, reference being had to the accompanying drawing in which:

Figure 1 is a fragmentary view showing a portion of an internal combustion engine, with portions thereof broken away and in section, showing a typical installation of a valve mechanism constructed in accordance with the invention;

Figure 2 is a sectional view of a valve mechanism constructed in accordance with the invention; and Figure 3 is a fragmentary elevational view of a portion of such valve mechanisms.

Referring more particularly to the drawing, Figure 1 shows an internal combustion engine indicated generally at 10 and including a cylinder 12 closed at its upper end by a head member 14. A piston 16 is reciprocably mounted in the cylinder 12 and forms an expansible combustion chamber 18 with the closed end thereof. The cylinder head 14 is provided with one or more valves 20 operable by conventional means, not shown, to control the admission and exhaust of gases to and from the combustion chamber through passages 22 provides in the cylinder head which are in turn connected to the engine manifold system, not shown. The combustion chamber is also ventable to atmosphere by a valve mechanism 24 constructed in accordance with the invention and including two axially offset passages 26 and 28 provided in the cylinder head 14.

As shown in Figure 2, the passage 26 connects the combustion chamber with an inlet port 30 opening on a valve chamber 32 and the passage 28 interconnects an outlet port 36 opening on the valve chamber 32 with a port 34 opening on the exterior of the cylinder head and adapted to mount a pressure indicator. The valve chamber 32 is formed by two counterbores 38 and 40 which are in axial alignment with the inlet port 30. A first cup-shaped casing member 42 is mounted in the two counterbores and is secured to a second cup-shaped casing member 43 by suitable means, such as by an annular clamping ring 45 and bolts 46 as shown, to form a spring chamber 44 therebetween. The bottom of the cup-shaped member 42 is axially spaced of the ports 30 and 36 and is perforated as indicated at 48 to form a valve guide reciprocably mounting the shank portion of a valve member 50 having a head portion 52 with two oppositely disposed frustoconical valve faces 54 and 58. When the valve member 50 is in its closed position as shown in Figure 2, the valve face 54 is adapted to sealingly engage a mating valve seat 56 circumscribing the valve inlet port 30. The valve member is normally biased to this closed position by yieldable biasing means in the form of a spring 62 which is compressively interposed between the end of the casing member 43 and a flange 64 of a spring seat member 66 which is reciprocably mounted in casing members 42 and 43, the spring 62 normally acting through the spring seating member 66 to establish a thrust connection with the shank end of the valve member 50. The fluid pressure from the combustion chamber at the port 30 normally urges the valve member towards its open position in opposition to the spring 62, acting on the end surface of the closed valve member inwardly of the valve seat 56, and is effective when the pressure in the combustion chamber exceeds a predetermined safe operating limit to shift the valve member to bring the valve face 58 into pressure sealing engagement with a mating valve seat 60 circumscribing the valve mounting opening 48 in the casing member 42 thus insuring against leakage of any of the high temperature, high pressure combustion gases into the spring chamber 44.

A spindle 68 integral with the flange portion 64 of the spring seating member 66 projects from the end of the casing member 43 and is slidably embraced by an axially extending annular boss 70 formed externally of the cup-shaped member 43. Two diametrically opposed slots 72 in the boss 70 are adapted to receive a transversely extending pin 74 carried by the end of the spindle 68 when the valve member 50 is in its closed position. When it is desired to open the valve for the purpose of venting the cylinder for any purpose, the spring seating member is axially shifted out of thrust engagement with the shank end of the valve member 50 whereupon the fluid pressure of the combustion chamber acting on the end of the valve member is effective to shift it into pressure sealing contact with the valve face 60. For this purpose an actuating handle, preferably a tool 76 of the form shown in Figure 3, is used to axially shift the spring seating member 66. The tool 76 comprises a handle 78 secured at one end to a U-shaped claw 80 having a first set of transversely aligned slots 82 adapted to engage the pin 74 and an over-center cam surface 84 adapted to engage shoulder 86 formed by the end of the casing member 43 and reacting therebetween upon rotation of the tool to the position shown in Figure 3 to axially shift the spindle to its valve opening position. If it is desired to leave the valve open, as in venting the engine before starting, the tool is used to rotate the pin 74 away from the slots 72. When the tool is then removed, the spindle carried pin engages the axial end of the boss 70 thus retaining the spring seating member out of valve closing engagement with the valve member. In this manner, a single tool can be utilized to open valves on the other cylinders of the same or similarly equipped engines. When it is desired to again close the valve, a second set of transversely aligned slots 88 in the claw 80 are placed over the pin 74 and the tool is then rotated till the pin coincides with the slots 72 whereupon the spring 62 is effective through the spring seating member to bias the valve member to its closed position.

It will be noted from the foregoing description that when the valve mechanism of the invention is being utilized as a test valve, the spring seating member 66 is withdrawn from heat conducting contact with the valve member 50 thereby preventing heat conduction directly to the valve spring through the gas exposed valve member and the flange portion of the spring seating member. When the valve is in its closed position operating as a safety valve, the valve member is substantially insulated from the hotter gases of the combustion chamber by the relatively stagnant gases entrapped in the passage 26 and the inlet port 30. The use of the over-center cam tool 76 and the effective areas of the valve member also permit the valve to be shifted rapidly from valve seat 56 to valve seat 60 when the valve is opened either as a test valve or as a safety valve thus insuring a minimum of gas leakage into the spring chamber.

While only one specific embodiment of the invention has been shown and described for the purpose of illustration, it will be appreciated that numerous modifications may be made without departing from the spirit and scope of the invention, as defined in the following claims.

I claim:

1. In an internal combustion engine, a combined safety and test valve mechanism for venting relatively high temperature and pressure fluids, said valve mechanism including a valve housing, passage means in said housing defining an inlet port connectable to a source of such fluid and an outlet port connected to the exterior of said housing, a valve member reciprocably mounted in said housing and operable between a closed and an open position to control fluid flow between said inlet and said outlet ports, a first valve seat circumscribing said inlet port, a second valve seat in said housing axially spaced from said first valve seat and circumscribing a bore coaxial and spaced from said inlet port, said valve member having a head portion thereon adapted to alternately engage said first valve seat when said valve member is in its closed position and to engage said second seat when said valve member is in its open position and having a shank portion slidably mounted in said bore, a spring seat member reciprocably mounted in said housing and adapted to establish a thrust connection with the shank portion of said valve member, a spring compressively interposed between said spring seat member and a shoulder carried by the housing and normally acting through said spring seat member to bias said valve member to its closed position, the fluid pressure supplied to said inlet port normally urging said valve member towards its open position in opposition to said spring and being effective when above a predetermined upper limit to shift said valve member to its open position, and means for selectively shifting said spring seat member out of engagement with said valve member thereby removing the biasing action of said spring from said valve member and permitting the fluid pressure supplied to said inlet port to shift said valve member to its open position.

2. In an internal combustion engine, a safety and test valve mechanism for venting relatively high temperature and pressure fluids, the combination comprising a housing member, passage means in said housing member including an inlet port connectable to a source of such fluid and an outlet port connected to the exterior of said housing member, a valve seat circumscribing said inlet port, said housing member having a bore therein axially aligned with said inlet port and intersecting said passage means intermediate said inlet and said outlet ports, and valve means mounted in said bore and operable to control fluid flow between said inlet and said outlet ports, said valve means including a hollow cylindrical casing, the end of said casing adjacent said ports defining a secondary valve seat circumscribing a bore therethrough and axially spaced from said first valve seat, the bore in said end of said casing reciprocably mounting a valve member, said valve member having a head thereon adapted to alternately engage said valve seats, said valve member when in engagement with said secondary seat being effective to establish fluid flow between said ports and sealing the bore in said end of said casing, a spring seat member reciprocably mounted in said casing and adapted to establish a thrust connection with said valve member, a spring compressively interposed between the end of said casing opposite said one end and said spring seat member and normally acting through said spring seat member to bias said valve member to its closed position in engagement with said inlet port valve seat, the fluid pressure supplied to said inlet port normally urging said valve member towards its open position in opposition to said spring and being effective when above a predetermined upper limit to shift said valve member into engagement with said secondary valve seat, and means associated with said spring seat member for selectively shifting said spring seat member out of thrust engagement with said valve member thereby compressing and removing the biasing action of said spring from said valve member thereby permitting the fluid pressure at said inlet port to shift said valve member into pressure sealing engagement with said secondary valve seat.

3. A valve mechanism for venting relatively high temperature and pressure fluids, said valve mechanism comprising a valve body, passage means in said body defining an inlet port connectable to a source of such fluids and an outlet port, said inlet port forming a first valve seat, a second valve seat in said body axially aligned with and spaced from said first valve seat, a valve member mounted in said body and movable between an open and a closed position to control fluid flow between said inlet and said outlet ports, said valve member having a head portion thereon adapted to engage said first valve seat when said valve member is in its closed position and to engage said second seat when said valve member is in its open position, fluid pressure from said chamber tending to urge said valve member towards its open position, spring means biasing said valve member toward its closed position in opposition to said fluid pressure, said spring means normally being effective to maintain said valve member in its closed position when the pressure supplied to said inlet port is below a predetermined limit, and means for selectively removing the biasing action of said spring means from said valve member whereby the fluid pressure supplied to said inlet port is effective to shift said valve member to its port-open position.

4. A valve mechanism for relatively high temperature and pressure fluids comprising, in combination, a housing having passage means formed therein including an inlet port connectable to a source of such fluid and circumscribed by a valve seat, an outlet port connectable to the exterior of said housing, and a valve chamber intermediate said inlet and said outlet ports, and valve means operable to control fluid flow between said inlet and said outlet ports, said valve means including a hollow cylindrical casing mounted in said valve chamber in axially spaced relation to said first valve seat, the end of said casing adjacent said ports defining a secondary valve seat, a valve member reciprocably mounted in said casing and having a head thereon adapted to alternately engage said valve seats, a spring seat member reciprocably mounted in said casing, means adapted to establish an operative connection between said spring seat member and said valve member, a spring compressively interposed between the end of said casing opposite said one end and said spring seat member and normally acting through said spring seat member and said connection means to bias said valve member into pressure sealing engagement with said inlet port valve seat, the fluid pressure at said inlet port normally urging said valve member towards its open position in opposition to said spring and being effective when the fluid pressure at said inlet port is above a predetermined upper limit to shift said valve member into pressure sealing engagement with said secondary valve seat, said valve member when in engagement with said secondary seat being effective to establish fluid flow between said ports, and means associated with said spring seat member and said casing for selectively shifting said spring seat member to compress said spring thereby removing the biasing action of said spring acting on said valve member through said connection means and permitting the fluid pressure in said chamber to shift said valve member into pressure sealing engagement with said secondary valve seat.

5. A valve mechanism as set forth in claim 4 in which said last-mentioned means includes an over center cam operable to react between said casing and said spring seat member to rapidly compress said spring.

6. A valve mechanism for high temperature and pressure fluids comprising a housing member, passage means in said housing member including an inlet port and an outlet port, a valve seat circumscribing said inlet port, said housing member having a bore therein axially aligned with said inlet port and intersecting said passage means intermediate said inlet and said outlet ports, and valve means mounted in said bore and operable to control fluid flow between said inlet and said outlet ports, said valve means including a hollow cylindrical casing, the end of said casing adjacent said ports defining a secondary valve seat circumscribing a bore therethrough and axially spaced from said first valve seat, the bore in said end of said casing reciprocably mounting a valve member, said valve member having a head thereon adapted to alternately engage said valve seats, said valve member when in engagement with said secondary seat being effective to establish fluid flow between said ports and sealing the bore in said end of said casing, a spring seat member reciprocably mounted in said casing and adapted to establish a thrust connection with said valve member, a spring compressively interposed between the end of said casing opposite said one end and said spring seat member and normally acting through said spring seat member to bias said valve member to its closed position in engagement with said inlet port valve seat, the fluid pressure at said inlet port normally urging said valve member toward its open position in opposition to said spring and being effective when above a predetermined upper limit to shift said valve member into engagement with said secondary valve seat, and means associated with said spring seat member for selectively shifting said spring seat member out of thrust engagement with said valve member thereby compressing and removing the biasing action of said spring from said valve member thereby permitting the fluid pressure at said inlet port to shift said valve member into pressure sealing engagement with said secondary valve seat.

7. A valve mechanism for fluids under extreme temperature and pressure conditions comprising a valve body, passage means in said body defining an inlet port connectable to a source of such fluids and an outlet port, said inlet port forming a first valve seat, a second valve seat in said body spaced from said first valve seat and circumscribing a bore formed in said body in axial alignment with said inlet, a valve member reciprocably mounted in said body bore and movable between an open and a closed position to control fluid flow between said inlet and said outlet ports, said valve member having a head portion thereon adapted to engage said first valve seat when said valve member is in its closed position and to engage said second seat when said valve member is in its open position, fluid pressure at said inlet port tending to urge said valve member towards its open position, spring means including a member thrustably engageable with said valve member and biasing said valve member toward its closed position in opposition to said fluid pressure, said spring means normally being effective to maintain said valve member in its closed position when the fluid pressure at said inlet port is below a predetermined limit, and means for selectively removing the biasing action of said spring means from said valve member whereby the fluid pressure at said inlet port is effective to shift said valve member to its port-open position.

References Cited in the file of this patent

UNITED STATES PATENTS

| | | |
|---|---|---|
| 382,329 | Seymour | May 8, 1888 |
| 790,764 | Tobey | May 23, 1905 |
| 1,196,862 | Hayes | Sept. 5, 1916 |
| 1,579,985 | Wheeler | Apr. 6, 1926 |
| 2,045,858 | Jung | June 30, 1936 |
| 2,122,484 | Murray | July 5, 1938 |

FOREIGN PATENTS

| | | |
|---|---|---|
| 68,789 | Germany | May 25, 1893 |
| 8,329 | Great Britain | Apr. 9, 1913 |